United States Patent [19]

Belyshev et al.

[11] 4,038,466
[45] July 26, 1977

[54] METHOD OF PRODUCING THICKENED ELECTROLYTE FOR PRIMARY CELL

[76] Inventors: Leonid Lavrentievich Belyshev, ulitsa Akademika Komarova, 19a, kv. 52; Albert Vladimirovich Chuvpilo, ulitsa Novo-Alexeevskaya, 48, korpus 37, kv. 281; Valentina Vladimirovna Trizno, ulitsa Bazhova, 15, korpus 1, kv. 215; Viktor Arsenievich Naumenko, ulitsa Novo-Axexeevskaya, 48, korpus 37, kv. 28; Lidia Fedorovna Penkova, 3 Mytischinskaya ulitsa, 14, kv. 124, all of Moscow; Veniamin Ivanovich Gorokhov, ulitsa 2 Novo-Proletarskaya, 1, kv. 4, Moskovskaya oblast Pushkinsky raion, poselok Pravdinsky; Evgenia Grigorievna Apirina, ulitsa Botanicheskaya, 17, kv. 7, Moscow; Sarra Abramovna Gantman, ulitsa B. Rupasovskaya, 15, korpus 16, kv. 17, Mytischi Moskovskoi oblasti, all of U.S.S.R.

[21] Appl. No.: 608,201

[22] Filed: Aug. 27, 1975

[51] Int. Cl.$^2$ .......................................... H01M 6/22

[52] U.S. Cl. .................................. 429/190; 429/201; 429/202

[58] Field of Search ............... 136/155, 131, 158, 157, 136/153; 429/190, 201, 202

[56] References Cited

U.S. PATENT DOCUMENTS

| 1,497,317 | 6/1924  | Askin      | 136/158 |
| 1,558,413 | 10/1925 | Teitelbaum | 136/158 |
| 2,708,685 | 5/1955  | Coleman    | 136/153 |
| 2,766,315 | 10/1956 | Jobe et al.| 136/155 |
| 2,773,786 | 12/1956 | Jobe       | 136/155 |

Primary Examiner—Donald L. Walton
Attorney, Agent, or Firm—Fleit & Jacobson

[57] ABSTRACT

A method of producing a thickened electrolyte for a primary cell, which involves mixing, at about room temperature, aqueous solutions of calcium chloride, zinc chloride, and ammonium chloride with a tanning agent, such as chromium sulphate, and starch as a thickening agent, aging the resulting mixture until a thickened electrolyte with a compressive strength of 0.05–0.85 kg/cm$^2$ is obtained and pressing said electrolyte through at least one drawhole at a rate of at least 0.05 m/sec, the resulting viscosity of the electrolyte being sufficient to apply a layer of the thickened electrolyte to the negative electrode of a primary cell.

5 Claims, 3 Drawing Figures

METHOD OF PRODUCING THICKENED ELECTROLYTE FOR PRIMARY CELL

The present invention relates to production of primary cells with a salt electrolyte of the manganese-zinc system, and more particularly to a method of producing thickened electrolyte for a primary cell.

Known in the art are several methods of producing thickened electrolyte for primary cells.

For example, there is known a method of producing thickened electrolyte for a primary cell, by using a mixture of starch and flour or carboxymethyl cellulose as the gelling agent, and an aqueous solution of ammonium chloride and zinc chloride as the electrolyte.

The suspension obtained by stirring is applied to one or two sides of a paper substrate-separator which is then dried and rolled up.

The layer of the thickened electrolyte is dried to a state enabling automation of the process of inserting the separator into the negative electrode of the primary cell.

The above method has a number of disadvantages.

The process of assembling a primary cell with such a dry separator requires prolonged aging before controlling the cell voltage.

This aging, which can be as long as seven days, is necessary for moisture distribution inside the cell and for grains of the gelling agent entering into the thickened electrolyte to swell. This makes it necessary to interrupt the whole process of assembling the cell since other final operations are performed after the voltage control.

The cells produced with such a composition of thickened electrolyte are inoperable at low temperatures, particularly at $-40°$ C, which considerably narrows the field of application of cells with such electrolyte.

Besides, this known method is disadvantageous in that the equipment used for producing a separator with a layer of thickened electrolyte is bulky and requires large production space.

It should also be noted that in a finished cell with the thickened electrolyte of the negative electrode produced by the known method, a high content of expensive active materials is introduced into the formulation of the positive electrode.

Likewise known in the art is a method of producing thickened electrolyte for primary cylindrical cells which involves mixing aqueous solutions of calcium, zinc, and ammonium chlorides with a solution of mercuric chloride, a tanning agent, and starch as the thickening agent at $14°-25°$ C.

Mixing of said components is performed until a bulk of a particular viscosity is obtained, which is then applied to a paper tape in a thin layer.

This paper tape is pre-wetted in a salt electrolyte and the bulk obtained by mixing the components is applied as it flows freely through a drawhole.

Next, the thickened electrolyte layer is aged in a heated chamber at $90°$ C and, upon leaving the chamber, the paper tape with the thickened electrolyte is dusted with starch to avoid adhesion.

Thereafter, the tape with the electrolyte is cut into sheets, packed in polyethylene bags, and held 2 or 3 days for the aging of the thickened electrolyte layer to be completed, whereupon the sheets are cut into card-shaped diaphragms and delivered for the assembly of primary cells.

The above method is disadvantageous in that due to the presence of starch on the surface of a card-shaped diaphragm, adhesion of the thickened electrolyte to the walls of the negative electrode is only 0.5 g/cm$^2$, thus resulting in the formation of crimps as the positive electrode is being prepressed, which, in turn, worsens the contact between the surface of the negative electrode and the thickened electrolyte layer.

As a result, non-working areas are formed on the surface of the negative electrode and the capacity of the whole primary cell is reduced.

When assembling a cell, the card-shaped diaphragm is inserted manually into the negative electrode, since it is not possible to obtain a paper tape roll with a thickened electrolyte layer because of the dilution of the latter at elevated ambient temperature. If it were possible to roll up the paper tape, the insertion of the card-shaped diaphragm could have been automated.

This prior art method is also disadvantageous in that the electrolyte thus obtained has a lower utilization factor in a cell equal to 0.9–0.8 for different type of cells. This is due to the fact that a layer of thickened electrolyte is applied to the whole of the surface of the card-shaped diaphragm, but the upper part of the card does not participate in the cell operation being tucked over the positive electrode in the process of assembly.

Another serious disadvantage of this method is the fact that the viscosity of the bulk flowing freely to the paper tape through a drawhole is very unstable and changes every few minutes. Therefore, to keep the viscosity at the required level, the bulk fed through the drawhole must be produced in small portions to ensure a uniform thickness of the layer applied to the paper tape.

It is an object of the invention to provide a method of producing thickened electrolyte applied to the negative electrode of a primary cell which would ensure high adhesion of the electrolyte obtained to the electrode walls and, consequently, increase the capacity of the whole primary cell.

Another object of the invention is to provide an electrolyte the application of which would enable the process of assembling the cell to be automated.

Still another object of the invention is to provide an electrolyte ensuring operation of primary cells at elevated and low (down to $-40°$C) temperatures.

Yet another object of the invention is to provide a method of producing thickened electrolyte which would ensure a high utilization factor of the electrolyte in the process of cell manufacture.

A further object of the invention is to develop a method for ensuring uniform thickness of the layer applied to the negative electrode.

With these and other objects in view, the present invention resides in a method of producing thickened electrolyte by mixing, at room temperature, aqueous solutions of calcium chloride, zinc chloride, and ammonium chloride with a tanning agent, such as chromium sulphate and starch as a thickening agent, and aging the resulting mixture till the formation of thickened electrolyte with a viscosity sufficient for the adhesion of an electrolyte layer to the negative electrode of a cell is obtained, in which, according to the invention, the said mixture is aged for a time period necessary for the formation of thickened electrolyte with a compressive strength of 0.05–0.85 kg/cm$^2$, the thickened electrolyte being pressed, after aging, through at least one drawhole at a rate of at least 0.05 m/sec, the resulting viscosity being sufficient to apply an electrolyte layer to the negative electrode of a primary cell.

It is expedient to age the mixture for at least 24 hours.

It is also expedient to carry out the mixing within the temperature range from 21° to 23° C.

It is preferable to use starch with a moisture content not in excess of 20%.

The invention will now be described in greater detail with reference to the accompanying drawings, in which.

The method of the invention for producing thickened electrolyte for primary cells is illustrated by the following Example 1:

A solution of a tanning agent is added to an aqueous solution of calcium chloride zinc chloride (4–5%), ammonium chloride (up to 7.5%), and starch as the thickening agent in amounts of 200 g per 1l of the total solution, and the resulting solution obtained is stirred at 14°–25° C.

This temperature range is chosen because of the fact that the thickened electrolyte produced from the initial solution at a temperature of below 14° C has low mechanical strength (within the range 0.02–0.05 kg/cm²) and low adhesion (about 0.0005 kg/cm²), which complicates the process of its application to the negative electrode. This is accompanied by the electrolyte being extruded from the inter-electrode gap during assembly of the cell, thus deteriorating the quality of the cells produced.

The thickened electrolyte obtained from the initial solution at a temperature above 25° C has high adhesion (up to 0.08 kg/cm²), but a low mechanical strength, which deteriorates the quality of the cells produced.

The process of stirring is continued until a viscosity of 25–180 poises is attained, after which the mixture is kept at room temperature for more than 24 hours.

As a result, a thickened electrolyte is obtained with a compressive strength within the range of 0.1–0.85 kg/cm².

Figure 1:
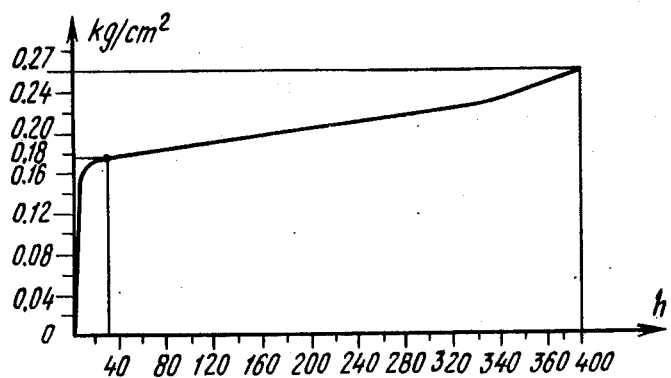
FIG. 1 shows the compressive strength of the thickened electrolyte versus time of aging, according to the invention.

FIG. 1 shows the compressive strength of the thickened electrolyte as a function of the aging time.

The highest quality layer of thickened electrolyte can be obtained when the latter is used after prolonged aging, i.e. when a maximum compressive strength is obtained, but such prolonged aging is uneconomical. The optimum aging time of the thickened electrolyte, when the layer is of a sufficiently good quality, may be assumed to be equal to 24–48 hours.

Next, the thickened electrolyte obtained is pressed through a drawhole at a rate of 0.05–0.9 m/sec. Pressing of the electrolyte through a drawhole at a rate of less than 0.05 m/sec may be used for laboratory purposes and small-scale production of cells because of the low efficiency of the process. Rates higher than 0.9 m/sec require high power equipment and considerable consumption of energy which is uneconomical.

An electrolyte with the required physico-mechanical properties is obtained by varying either the rate of pressing through a drawhole, or the ratio of the flow rate per second of the thickened electrolyte through one channel of a drawhole to the volume of this channel within 50–900, or the number of drawhole sections used.

The present invention of producing a thickened electrolyte has a number of essential advantages, one of these advantages being the fact that the primary cells manufactured with the inventive electrolyte exhibit improved electrical properties as compared to cells with card-shaped paper separators with a layer of thickened electrolyte.

Figure 2:
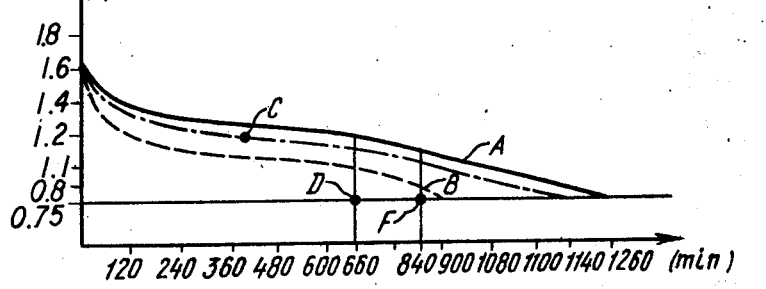
FIG. 2 shows the relations between the operating voltages and the operation time of cells of the R20 type with the electrolyte obtained according to the invention and with the electrolyte obtained by the prior art method.

FIG. 2 shows the relationships between operating voltages and operation time for cells of the R20 type with the electrolyte obtained by the method of the invention and with that applied to a card-shaped paper separator.

Curve A represents said relation for cells with the electrolyte produced by the inventive method, used at the beginning of storage; curve B shows same after eighteen months of storage, and curve C shows same for cells with electrolyte obtained, by the prior art method, at the beginning of storage.

These relations demonstrate that the service life of cells with thickened electrolyte obtained by the inventive method is longer than that of cells of the same type with the prior art electrolyte, operating under the same discharge conditions and having the following parameters: resistance, $R=5$ ohm, final cell voltage $U=0.75$ V.

Discharging is performed 5 days a week, 10 minutes a day.

Figure 3:
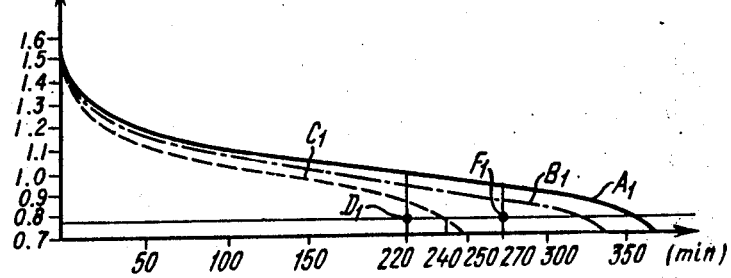
FIG. 3 shows the same relations as in FIG. 2 for cells of the R12 type.

The same can be inferred from the curves of FIG. 3 which shows the relations between operating voltages and operation time for a cell of the R12 type with the electrolyte produced by the inventive method (curve $A_1$ for cells used at the beginning of storage; curve $B_1$, for cells used after six months of storage) and for cells of the same type with binding of the positive electrode and with the electrolyte produced by the known method, used at the beginning of storage (curve $C_1$) under the discharging conditions described above. Points D, F (FIG. 2) and $D_1$, $F_1$ (FIG. 3) denote the values recommended by the International Electrotechnical Commission for cells after 6 months of storage, and for cells at the beginning of storage respectively.

Improved physico-mechanical properties of the thickened electrolyte produced by the method of the invention allows its application to a negative electrode mechanically with subsequent insertion of a separator, which makes the process highly efficient.

This makes it possible to vary the thickness of the layer from several millimeters to fractions of a millimeter, applying the layer to a given portion of the negative electrode, thus reducing the consumption of the electrolyte by 15–20%.

The properties of the thickened electrolyte obtained ensure operation of cells at low temperatures (down to -40°C).

In addition, the use of thickened electrolyte in cells of the R20 and R12 type permits the employment of positive electrodes made of low-grade materials, which does not affect the high electrical properties of these cells (FIGS. 2 and 3).

The process of assembling the cells is continuous. The equipment used for producing the electrolyte is simple in design and easy to operate. It takes 1–1.5 hours for this equipment to produce enough thickened electrolyte to manufacture up to 1.5 millions of primary cells of the R20 type.

Finally, the thickened electrolyte prepared by the present method does not lose any of its properties during lengthy storage at room temperature.

The invention is described below in a number of concrete examples illustrating the method of producing thickened electrolyte for primary current sources according to the present invention.

EXAMPLE 1

A solution of chromium sulfate is added to an aqueous solution of calcium chloride, zinc chloride and ammonium chloride in an amount of 20 ml per 1 liter of the solution, and starch, with a moisture content of 6%, is used as a thickening agent added in amounts of 250 g per 1 liter of the solution, the resulting mixture being stirred at a temperature of 14° C until a viscosity of 25 poise is reached.

The resulting electrolyte solution is kept at a temperature of 18° C for 48 hours. When the resulting thickened electrolyte is compressed, its ultimate strength is equal to 0.12 kg/cm$^2$ and adhesion to 0.0005 kg/cm$^2$.

After pressing through a drawhole at a rate of 0.05 m/sec and at a ratio of the flow rate per second to the volume of one drawhole channel equal to 50, the electrolyte is ready for the application to the inner surface of the negative electrode for those primary cells in which the positive electrode is formed under a reduced pressure on a layer of the thickened electrolyte.

EXAMPLE 2

A solution of chromium sulphate is added to an aqueous solution of calcium chloride (27%), zinc chloride (5%), and ammonium chloride (7.5%) in amounts of 20 ml per 1 liter of the solution. Starch with a moisture content of 18% is used as the thickening agent in amounts of 200 g per 1 liter of the solution. The mixture is stirred at 20° C until a viscosity of 150 poises is reached.

The resulting electrolyte solution is kept at 12° C for 60 hrs which results in the formation of thickened electrolyte with a compressive strength of 0.3 kg/cm$^2$ and adhesion of 0.03 kg/cm$^2$.

After pressing through a drawhole at a rate of 0.4 m/sec and at a ratio between the flow rate per second and the volume of a drawhole channel equal to 400, the electrolyte thus obtained is suitable for direct application to the inner surface of the negative electrode of primary cells in which the positive electrode is formed under a reduced pressure on an applied thickened electrolyte layer.

For cells where the positive electrode is formed under a higher pressure, the negative electrodes with an applied layer of thickened electrolyte are first kept for 1.5–2 hours at room temperature, thus enhancing the hardness of the applied electrolyte layer.

EXAMPLE 3

A solution of chromium sulphate is added to an aqueous solution of calcium chloride (26.5%), zinc chloride (4.5%), and ammonium chloride (7%) in amounts of 20 ml per 1 liter of the solution. Starch with a moisture content of 15% is used as the thickening agent in amounts of 200 g per 1 liter of the solution. The mixture is stirred at 25° C until a viscosity of 80 poises is attained. The electrolyte solution thus obtained is kept at 20° C for 24 hrs. The compressive strength of the resulting electrolyte is 0.18 kg/cm$^2$, and adhesion is 0.0005 kg/cm$^2$. The thickened electrolyte, after being pressed through a drawhole at a rate of 0.7 and at a ratio of the flow rate per second to the volume of one channel of the drawhole equal to 700, may be applied to the inner surface of the negative electrode of a cell.

The positive electrode of a primary cell with such an electrolyte has a formulation with a considerable content of low-grade active materials.

For example, a cell of the R12 type has the positive electrode composed of such compounds as activated perolusite (15%), ore (62.8%), carbon black (3%), graphite (19.2%), and ammonium chloride (15%); a cell of the R20 type has its positive electrode composed of activated perolusite (40%), ore (40%), carbon black (3.5%), and graphite (16.5%).

The use of positive electrodes of such composition saves expensive materials considerably, which becomes possible only due to application of the thickened electrolyte produced by the method of the invention.

What is claimed is:

1. A method of producing a thickened electrolyte for a primary cell, comprising the steps of:
    a. mixing, at room temperature, aqueous solutions of calcium chloride, zinc chloride, and ammonium chloride with chromium sulphate and starch;
    b. aging the resulting mixture until a thickened electrolyte having a compressive strength of 0.05–0.85 kg/cm$^2$ is formed; and
    c. pressing said thickened electrolyte through at least one drawhole at a rate of at least 0.05 m/sec, the resulting viscosity of said electrolyte being sufficient for the application of a layer of said thickened electrolyte to the negative electrode of said cell.

2. A method as claimed in claim 1, wherein said mixture is aged for at least 24 hours.

3. A method as claimed in claim 1, wherein said mixing is performed at a temperature of 21° to 23° C.

4. A method as claimed in claim 1, wherein the moisture content of said starch does not exceed 20%.

5. The electrolyte produced by the method of claim 1.

* * * * *